US012680604B2

(12) United States Patent
Kishimoto et al.

(10) Patent No.: US 12,680,604 B2
(45) Date of Patent: Jul. 14, 2026

(54) VEHICLE DRIVE TRANSMISSION DEVICE

(71) Applicant: AISIN CORPORATION, Kariya (JP)

(72) Inventors: Naoya Kishimoto, Kariya (JP); Sho Yamanaka, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/855,073

(22) PCT Filed: Jul. 12, 2023

(86) PCT No.: PCT/JP2023/025714
§ 371 (c)(1),
(2) Date: Oct. 8, 2024

(87) PCT Pub. No.: WO2024/018963
PCT Pub. Date: Jan. 25, 2024

(65) Prior Publication Data
US 2025/0243928 A1 Jul. 31, 2025

(30) Foreign Application Priority Data

Jul. 21, 2022 (JP) ................................. 2022-116684

(51) Int. Cl.
F16H 57/04 (2010.01)
(52) U.S. Cl.
CPC ..... F16H 57/0423 (2013.01); F16H 57/0409 (2013.01); F16H 57/0424 (2013.01);
(Continued)
(58) Field of Classification Search
CPC ............. F16H 57/0423; F16H 57/0409; F16H 57/0424; F16H 57/045; F16H 57/0457; F16H 57/0483; F16H 57/0495
See application file for complete search history.

(56) References Cited

U.S. PATENT DOCUMENTS

| | | | | |
|---|---|---|---|---|
| 5,505,112 A | * | 4/1996 | Gee | F16H 57/0447 184/6.12 |
| 6,053,835 A | * | 4/2000 | Shibazaki | F16H 48/08 475/160 |

(Continued)

FOREIGN PATENT DOCUMENTS

| | | |
|---|---|---|
| DE | 10 2007 011029 A1 | 9/2008 |
| JP | 2008-256083 A | 10/2008 |

(Continued)

OTHER PUBLICATIONS

Sep. 26, 2023 International Search Report issued in International Patent Application No. PCT/JP2023/025714.

(Continued)

*Primary Examiner* — Timothy Hannon
(74) *Attorney, Agent, or Firm* — Oliff PLC

(57) ABSTRACT

A main case includes a specific facing surface that faces, in a radial direction, a first side surrounding portion of a differential case that surrounds a first side projection disposed so as to project to an axial first side with respect to a differential input gear in a differential gear mechanism, and that is formed so as to surround the first side surrounding portion from a lower side, and a side wall surface that is formed so as to extend to radial inside from an end portion of the specific facing surface on the axial first side. An oil accumulating portion in which oil is accumulated is formed in a space surrounded by the specific facing surface, the side wall surface, and a surface of the differential input gear facing the axial first side.

8 Claims, 3 Drawing Sheets

(52) U.S. Cl.
    CPC ....... *F16H 57/045* (2013.01); *F16H 57/0457*
        (2013.01); *F16H 57/0483* (2013.01); *F16H*
                            *57/0495* (2013.01)

(56) References Cited

U.S. PATENT DOCUMENTS

| | | | | |
|---|---|---|---|---|
| 8,739,931 | B2 * | 6/2014 | Masuda .............. | F16H 57/0483 |
| | | | | 184/6.12 |
| 2017/0102065 | A1 * | 4/2017 | Ohmura .................. | F16H 48/42 |
| 2017/0130816 | A1 | 5/2017 | Koga | |
| 2017/0159797 | A1 * | 6/2017 | Kawabuchi ......... | F16H 57/0453 |
| 2018/0106359 | A1 * | 4/2018 | Kawakami .......... | F16H 57/0423 |
| 2025/0207660 | A1 * | 6/2025 | Yamashita .......... | F16H 57/0423 |

FOREIGN PATENT DOCUMENTS

| | | | |
|---|---|---|---|
| JP | 2015-178887 | A | 10/2015 |
| JP | 2015-222106 | A | 12/2015 |
| JP | 2021-063538 | A | 4/2021 |

OTHER PUBLICATIONS

Jul. 17, 2025 Extended Search Report issued in European Application No. 23842887.4.

* cited by examiner

VEHICLE DRIVE TRANSMISSION DEVICE

TECHNICAL FIELD

The present disclosure relates to a vehicle drive transmission device including a differential gear device and a main case that houses the differential gear device and stores oil therein.

BACKGROUND ART

JP 2015-178887 A discloses a differential gear device (1) in which oil is stored in a case (2) that houses a differential gear mechanism (The reference signs in parentheses in the background art are those of the referenced literature.). A differential input gear (12) that inputs drive power to the differential gear mechanism and a differential case (10) that rotates integrally with the differential input gear (12) are housed in the case (2). The differential case (10) houses therein a pinion gear (15), a pinion shaft (14), and paired side gears (18, 19). An opening is formed in the differential case (10) to communicate the inside and the outside of the differential case (10), and lubricating oil is supplied to members to be lubricated such as a gear and a support member of the gear housed in the differential case (10) through the opening. Specifically, the differential input gear (12) scopes up the oil stored in the case (2), so that the lubricating oil is supplied into the differential case (10) through the opening.

In the case of such a structure, if the oil level inside the case (2) is high during the rotation of the differential input gear (12), the stirring resistance caused by the differential input gear (12) scraping up the oil increases, and the loss of power transmission in the differential gear device (1) increases. Therefore, in the differential gear device (1) disclosed in the above literature, a baffle plate (30) is disposed in the case (2). The space in the case (2) is partitioned into a first chamber (C1) in which the differential input gear (12) is disposed and a second chamber (C2) located on the opposite side to the differential input gear (12) with the baffle plate (30) interposed therebetween. A part of the oil scraped up by the differential input gear (12) is stored in the second chamber (C2), the oil level of the oil scraped up by the differential input gear (12) decreases, and the stirring resistance of the differential input gear (12) decreases accordingly.

CITATIONS LIST

Patent Literature

Patent Literature 1: JP 2015-178887 A

SUMMARY OF DISCLOSURE

Technical Problems

Meanwhile, when a differential gear device starts to rotate from a stopped state, it takes a certain amount of time for the scraped oil to reach a member to be lubricated in a differential case. That is, at the initial stage of rotation, there is a possibility that sufficient oil is not supplied to a gear and a support member of the gear housed in the differential case. For example, when the baffle plate is provided as in the differential gear device disclosed in the above literature, the amount of oil at the initial stage of rotation can be increased. Therefore, there is a possibility that the amount of oil scraped up by the differential input gear can be increased to supply more oil more quickly to the differential case. However, when the baffle plate is provided, the cost of the device increases due to the cost of the baffle plate member and the assembly cost for assembling the baffle plate.

In view of the above background, it is desired to achieve a vehicle drive transmission device capable of appropriately supplying lubricating oil into a differential case enclosing a differential gear mechanism even at the initial stage of rotation when a differential input gear that transmits drive power to the differential gear mechanism starts to rotate from a stationary state without providing a baffle plate.

Solutions to Problems

A vehicle drive transmission device in view of the above problem includes a differential gear device and a main case that houses the differential gear device and stores oil therein, the differential gear device includes a differential input gear to which drive power from a drive source of a wheel is transmitted, a differential gear mechanism that distributes drive power transmitted to the differential input gear to a pair of output members each of which is drivingly coupled to a pair of the wheels, and a differential case that is coupled to the differential input gear so as to rotate integrally with the differential input gear and encloses the differential gear mechanism, the differential case includes an opening that communicates inside in which the differential gear mechanism is disposed and outside, when a direction along a rotation axis of the differential input gear is defined as an axial direction, a direction orthogonal to the rotation axis is defined as a radial direction, and one side in the axial direction is defined as an axial first side, the differential gear mechanism includes a first side projection that is a portion disposed so as to project to the axial first side with respect to the differential input gear, when a portion surrounding the first side projection in the differential case is defined as a first side surrounding portion, the main case includes a specific facing surface facing the first side surrounding portion in the radial direction, and a side wall surface formed so as to extend inside in the radial direction from an end portion of the specific facing surface on the axial first side, the specific facing surface is disposed inside in the radial direction with respect to a tooth portion of the differential input gear, and is formed so as to surround the first side surrounding portion from a lower side, and when an oil level in a state where the differential input gear stops, and the oil level is the highest inside the main case is defined as a static oil level, the opening is located on a lower side with respect to the static oil level, and an oil accumulating portion in which oil is accumulated is formed in a space surrounded by the specific facing surface, the side wall surface, and a surface of the differential input gear facing the axial first side.

The oil accumulated in the oil accumulating portion is less likely to be affected by the scraping by the differential input gear. According to this configuration, for example, even in a case where a vehicle starts after stopping for a long period of time, the oil accumulated in the oil accumulating portion can be introduced into the differential case along with the rotation of the differential case. Therefore, at the initial stage of rotation when the differential input gear starts to rotate from a stationary state, it is easy to supply lubricating oil into the differential case. In addition, since the opening formed in the differential case is located on the lower side with respect to the static oil level, it is also easy to introduce oil into the differential case from the opening at the initial stage of rotation. When the differential input gear rotates, the oil circulates in the main case by scraping up, so that the oil level of the oil accumulated in the main case naturally decreases. That is, according to this configuration, by providing the oil accumulating portion, it is possible to appropriately supply the lubricating oil into the differential case even at the initial stage of rotation without adjusting the height of the oil level using a baffle plate, and it is possible to reduce the stirring resistance of the differential input gear after the start of rotation. As described above, according to this configuration, it is possible to achieve the vehicle drive transmission device capable of appropriately supplying the lubricating oil into the differential case enclosing the differential gear mechanism even at the initial stage of rotation when the differential input gear that transmits drive power to the differential gear mechanism starts to rotate from a stationary state, without providing the baffle plate.

Further features and advantages of the vehicle drive transmission device will become apparent from the following description of exemplary and non-limiting embodiments described with reference to the drawings.

DESCRIPTION OF EMBODIMENTS

Figure 1:
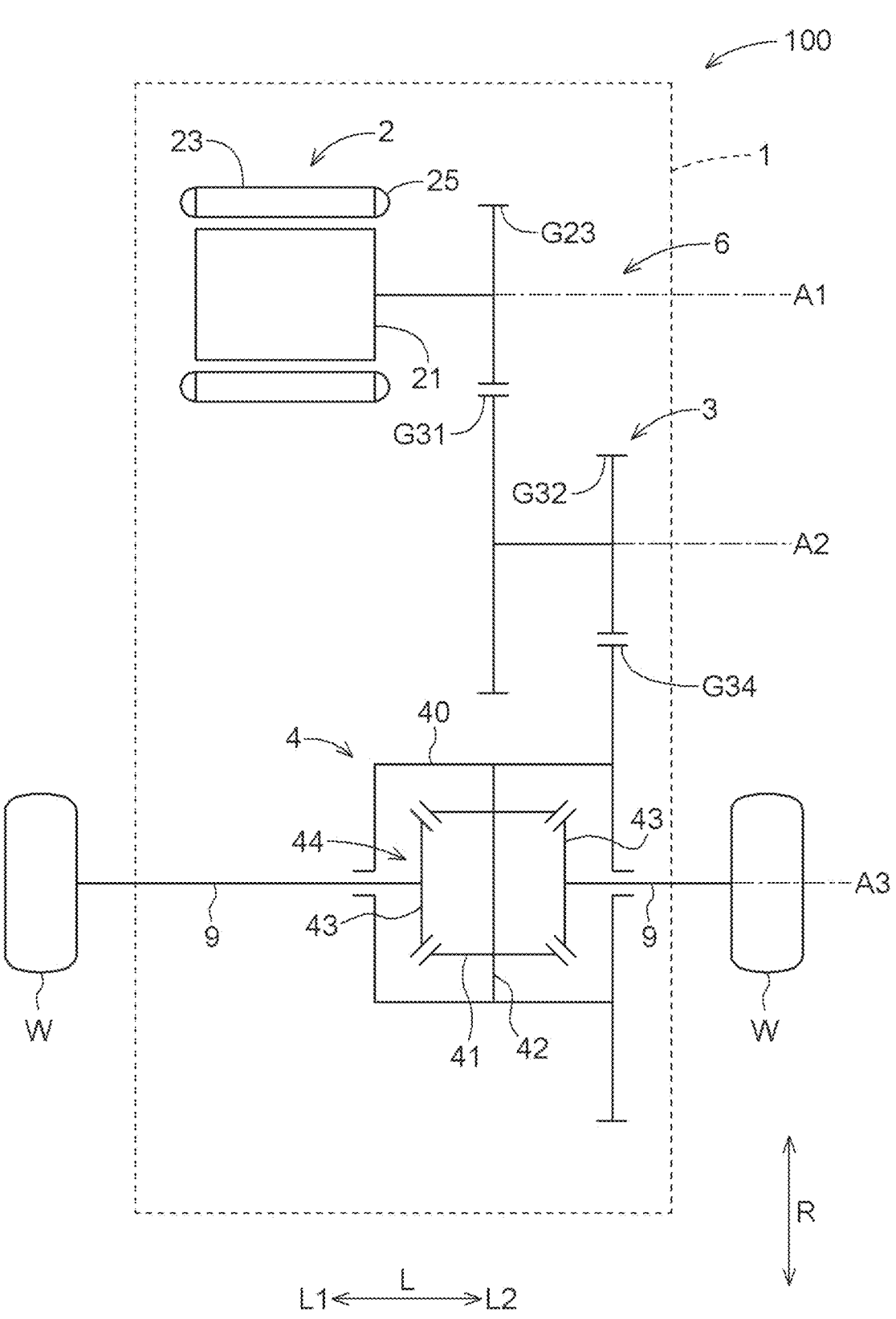
FIG. 1 is a skeleton diagram illustrating an example of a vehicle drive transmission device.

Hereinafter, embodiments of a vehicle drive transmission device including a differential gear device and a main case that houses the differential gear device and stores oil therein will be described with reference to the drawings. As illustrated in FIG. 1, a vehicle drive transmission device 100 according to the present embodiment includes a rotating electrical machine 2 that is a drive power source for wheels W, an output member (side gear 43 or drive shaft 9 to be described later) drivingly coupled to the wheels W, a gear mechanism 6 that drivingly couples the rotating electrical machine 2 and the output member, and a main case 1 that houses the rotating electrical machine 2 and the gear mechanism 6. Although not illustrated, for example, the main case 1 is partitioned into at least two housing chambers by a partition wall, the rotating electrical machine 2 is housed in one housing chamber, and the gear mechanism 6 is housed in the other housing chamber.

The gear mechanism 6 provided in the power transmission path between the rotating electrical machine 2 and the output member includes a plurality of gears that drivingly couple the rotating electrical machine 2 and the output member. As illustrated in FIG. 1, in the present embodiment, an input gear G23, a counter gear mechanism 3, a differential input gear G34, and a differential gear mechanism 44 are provided as the plurality of gears. The differential gear mechanism 44 distributes the drive power transmitted from the rotating electrical machine 2 to the differential input gear G34 via the plurality of gears to each of the pair of wheels W via the pair of side gears 43. The pair of side gears 43 corresponds to the output member. In the present embodiment, the wheel W and the side gear 43 are coupled via the drive shaft 9. Therefore, the drive shaft 9 can also be considered as the output member. In this case, it can also be considered that the pair of side gears 43 of the differential gear mechanism 44 corresponds to the output member and is included in the gear mechanism 6.

The rotating electrical machine 2 and the input gear G23 are arranged on a first axis A1, and the counter gear mechanism 3 is disposed on a second axis A2 that is a separate axis parallel to the first axis A1. The differential input gear G34 and the differential gear mechanism 44 are arranged on a third axis A3 that is a separate axis parallel to the first axis A1 and the second axis A2. The drive shaft 9 and the wheels W are also arranged on the third axis A3.

Note that, in the present application, "drivingly couple" refers to a state where two rotating elements are coupled so as to be able to transmit drive power, and includes a state where the two rotating elements are coupled so as to rotate integrally, or a state where the two rotating elements are coupled so as to be able to transmit drive power via one or two or more transmission members. Examples of such a transmission member include various members that transmit rotation at the same speed or at a variable speed, such as a shaft, a gear mechanism, a belt, and a chain. As the transmission member, an engagement device that selectively transmits rotation and drive power, for example, a friction engagement device, a meshing engagement device, or the like may be included.

The first axis A1, the second axis A2, and the third axis A3 are virtual axes different from each other, and are arranged in parallel to each other as described above. In the following description, a direction parallel to the first axis A1 is referred to as an axial direction L. Since the first axis A1 and the second axis A2 are parallel to each other, the axial direction L is also parallel to the second axis A2. In addition, since the third axis A3 is also parallel to the first axis A1 and the second axis A2, the axial direction L is also parallel to the third axis A3. Furthermore, one side (in the present embodiment, the side on which the rotating electrical machine 2 is disposed with respect to the gear mechanism 6) in the axial direction L is referred to as "axial first side L1", and the opposite side is referred to as "axial second side L2".

A direction orthogonal to each of the first axis A1, the second axis A2, and the third axis A3 is referred to as "radial direction R" with reference to each axis. Note that, in a case where it is not necessary to distinguish which axis is to be used as a reference or in a case where it is clear which axis is to be used as a reference, it may be simply referred to as "radial direction R". In addition, a direction along the vertical direction in a state where the vehicle drive transmission device 100 is mounted on a vehicle is referred to as "vertical direction V", and an upper side is referred to as "upper side V1" and a lower side is referred to as "lower side V2". In a case where the vehicle drive transmission device 100 is mounted on the vehicle in a state of being parallel to the horizontal plane, one direction in the radial direction R matches the vertical direction V. Note that, in the following description, terms related to directions, positions, and the like of the individual members have a concept including a state where a difference due to an error allowable in manufacturing is included.

The rotating electrical machine 2 is a rotating electrical machine (Motor/Generator) that operates with alternating current of a plurality of phases (for example, three-phase alternating current), and can function as both an electric motor and a generator. The rotating electrical machine 2 receives power supply from a DC power supply (not illustrated) and performs power running, or supplies (regenerates) power generated by inertia of the vehicle to the DC power supply. The rotating electrical machine 2 includes a stator 23 fixed to the main case 1, and a rotor 21 rotatably supported inside the stator 23 in the radial direction R. The stator 23 includes a stator core and a stator coil 25 wound around the stator core, and the rotor 21 includes a rotor core and a permanent magnet disposed in the rotor core.

As illustrated in FIG. 1, the input gear G23 is coupled to the rotor 21 of the rotating electrical machine 2 so as to rotate integrally with the rotor 21. The input gear G23 is coupled to, for example, an input shaft coupled to a rotor shaft of the rotor 21 so as to rotate integrally with the rotor shaft. The input gear G23 may be formed integrally with the input shaft on the outer peripheral side of the input shaft, or may be formed separately from the input shaft and coupled to the input shaft. In any case, the input gear G23 rotates integrally with the rotor 21. The input gear G23 is drivingly coupled to the counter gear mechanism 3.

The counter gear mechanism 3 is disposed on the second axis A2, and drivingly couples the rotating electrical machine 2 and the differential gear mechanism 44 via the input gear G23 and the differential input gear G34. In the present embodiment, the counter gear mechanism 3 has two gears (first counter gear G31 and second counter gear G32) that are coupled by a shaft member (counter shaft) and rotate integrally. That is, the counter gear mechanism 3 is disposed on the second axis A2, and includes the first counter gear G31 that meshes with the input gear G23, and the second counter gear G32 that rotates integrally with the first counter gear G31 and meshes with the differential input gear G34.

Figure 3:
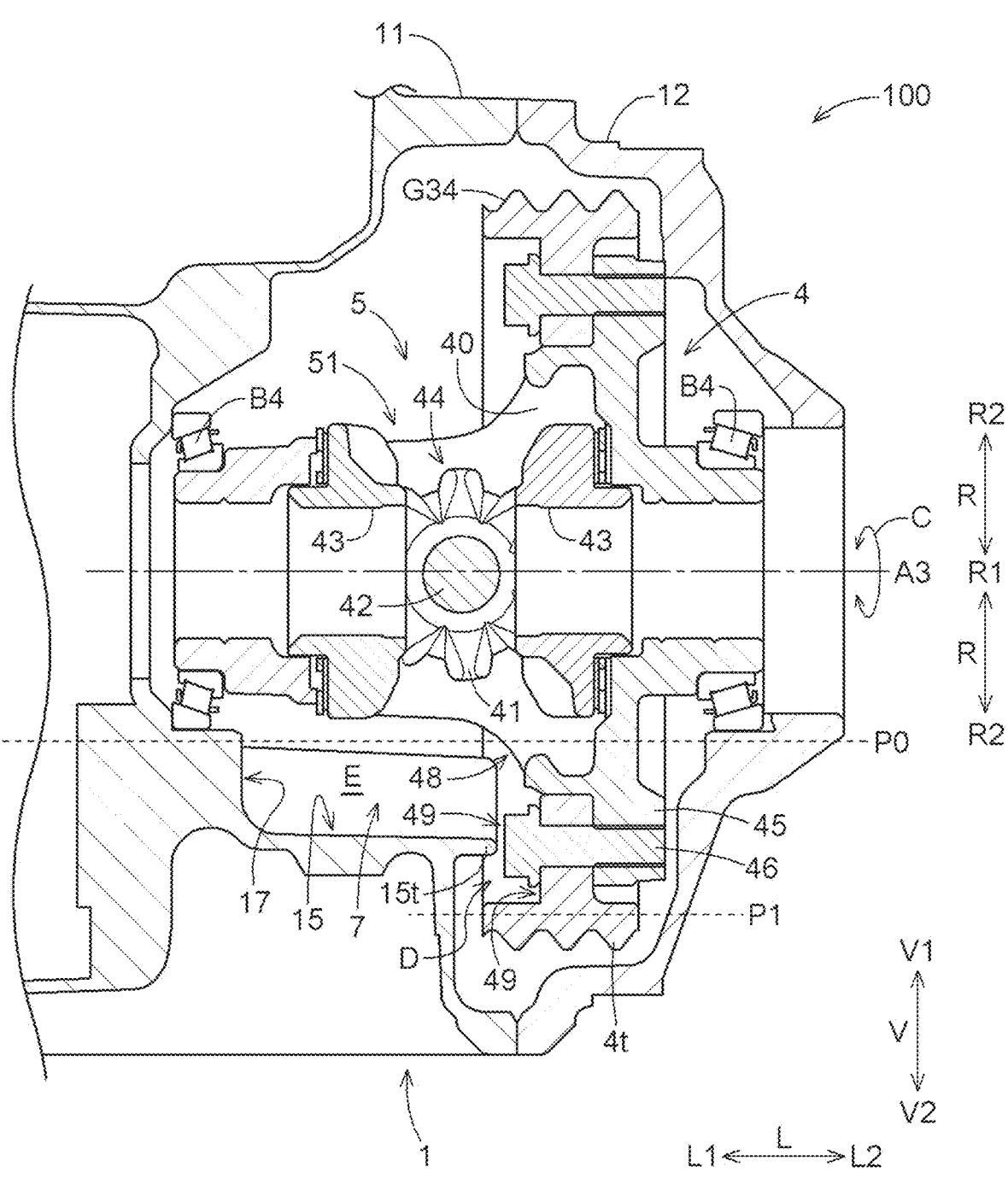
FIG. 3 is a schematic cross-sectional view of a differential gear device as viewed in an axial direction.

The differential input gear G34 constitutes a differential gear device 4 together with a differential case 40 and the differential gear mechanism 44. As illustrated in FIG. 3, the differential gear device 4 is rotatably supported with respect to the main case 1 by a pair of differential bearings B4. The main case 1 includes a body case 11 having an opening on at least one side in the axial direction L, here, on the axial second side L2, and a cover case 12 that abuts against the body case 11 from the axial second side L2 so as to close the opening. In the present embodiment, the paired differential bearings B4 are supported by the body case 11 and the cover case 12, respectively. The differential input gear G34 is fixed to a support member 45 using a fastening member 46, and the support member 45 is rotatably supported in the main case 1 by the differential bearing B4. The support member 45 constitutes the differential case 40. Note that the differential input gear G34 is not limited to be fixed so as to rotate integrally with the support member 45 using the fastening member 46, and may be formed integrally with the same member as the support member 45 supported by the differential bearing B4.

The differential gear mechanism 44 is enclosed in the differential case 40 and includes a pair of pinion gears 41 and a pair of side gears 43 meshing with the pair of pinion gears. The pair of pinion gears 41 and the pair of side gears 43 are both bevel gears, and the differential gear mechanism 44 of the present embodiment is a bevel gear type differential gear mechanism. The differential case 40 is a hollow member that houses the pair of pinion gears 41 and the pair of side gears 43. The differential case 40 and the differential input gear G34 are coupled so as to rotate integrally.

The paired pinion gears 41 are arranged so as to face each other with a space therebetween in the radial direction R with reference to the third axis A3. A pinion shaft 42 is supported on the differential case 40 so as to rotate integrally with the differential case 40, and the pair of pinion gears 41 is attached to the pinion shaft 42. Each of the paired pinion gears 41 can rotate (revolve) about the pinion shaft 42 and can rotate (revolve) about the third axis A3. The pair of pinion gears 41 meshes with the pair of side gears 43. The paired side gears 43 are arranged so as to face each other with a space therebetween in the axial direction L and with the pinion shaft 42 interposed therebetween and so as to rotate about the third axis A3 as a rotation axis. As illustrated in FIG. 1, each of the side gears 43 is drivingly coupled to each of the paired drive shafts 9, and each of the drive shafts 9 is drivingly coupled to each of the paired wheels W.

The rotating electrical machine 2 and the gear mechanism 6 constituting the vehicle drive transmission device 100 are lubricated with oil (including cooling). Specifically, the bearings (not illustrated) that support the rotor shaft, the input shaft, and the counter shaft, the differential bearing B4, the differential gear mechanism 44 housed in the differential case 40, the stator coil 25 of the rotating electrical machine 2, and the like are lubricated and cooled with oil. Hereinafter, these are collectively referred to as portions to be lubricated as appropriate. The lubricating oil can be supplied by a mechanical oil pump (not illustrated) that is driven using one or more of the drive power sources (the rotating electrical machine 2 described above, and in a case where an internal combustion engine or the like is separately provided, the internal combustion engine is also included) of the wheels W as a drive power source, an electric oil pump (not illustrated) that is driven by a drive power source (for example, a rotating electrical machine (motor) different from the rotating electrical machine 2) different from the drive power source of the wheels W, and the like. Furthermore, it is also possible to supply oil to another portion to be lubricated by, after lubricating some of the portions to be lubricated, scraping up the oil, which has dropped due to gravity and been stored in the main case 1 (oil reservoir located at the bottom of the main case 1), using a rotating member housed in the main case 1, or by blowing off the oil by centrifugal force.

For example, the gear that is enclosed in the differential case 40 and constitutes the differential gear mechanism 44 can be lubricated by introducing oil scraped up by the differential input gear G34 into the differential case 40 from the opening 48 formed in the differential case 40. However, when the differential gear device 4 starts to rotate from a stopped state, it takes a certain amount of time for the oil scraped up by the differential input gear G34 to reach the differential gear mechanism 44 in the differential case 40. That is, at the initial stage of rotation, there is a possibility that oil is not sufficiently supplied to gears housed in the differential case 40 and support members such as bearings. For example, in a case where the vehicle starts after stopping for a relatively long time, there is a possibility that the differential gear mechanism 44 is not sufficiently lubricated immediately after the start. In particular, in a case where the outside air temperature is low and the viscosity of the oil is high, it is difficult to guide the oil to the opening 48 of the differential case 40, and it is difficult to supply the oil to the differential gear mechanism 44 enclosed in the differential case 40. The vehicle drive transmission device 100 of the present embodiment has a structure capable of appropriately supplying lubricating oil into the differential case 40 enclosing the differential gear mechanism 44 even at the initial stage of rotation when the differential input gear G34 that transmits drive power to the differential gear mechanism 44 starts to rotate from a stationary state.

As described above, the differential gear device 4 includes the differential input gear G34 to which drive power from the drive source (here, rotating electrical machine 2) of the wheel W is transmitted, the differential gear mechanism 44 that distributes the drive power transmitted to the differential input gear G34 to the pair of output members (here, the side gear 43) each of which is drivingly coupled to the pair of wheels W, and the differential case 40 that is coupled to the differential input gear G34 so as to rotate integrally with the differential input gear and encloses the differential gear mechanism 44. In addition, the differential case 40 includes the opening 48 that communicates the inside in which the differential gear mechanism 44 is disposed and the outside. In the differential case 40, the opening 48 is formed separately from openings on both sides in the axial direction L (here, openings through which the drive shaft 9 is inserted). The opening 48 is formed in the intermediate portion of the differential case 40 in the axial direction L.

As illustrated in FIG. 3, the differential gear mechanism 44 includes a first side projection 5 that is a portion disposed so as to project from the differential input gear G34 to the axial first side L1. That is, in the present embodiment, the differential input gear G34 is disposed biased to the axial second side L2 with respect to the arrangement position of the differential gear mechanism 44 in the axial direction L. The differential case 40 is coupled to the differential input gear G34 on the axial second side L2, and the first side projection 5 of the differential gear mechanism 44 is enclosed in the differential case 40 on the axial first side L1 with respect to the differential input gear G34. Here, a portion of the differential case 40 surrounding the first side projection 5 is referred to as a first side surrounding portion 51.

Figure 2:
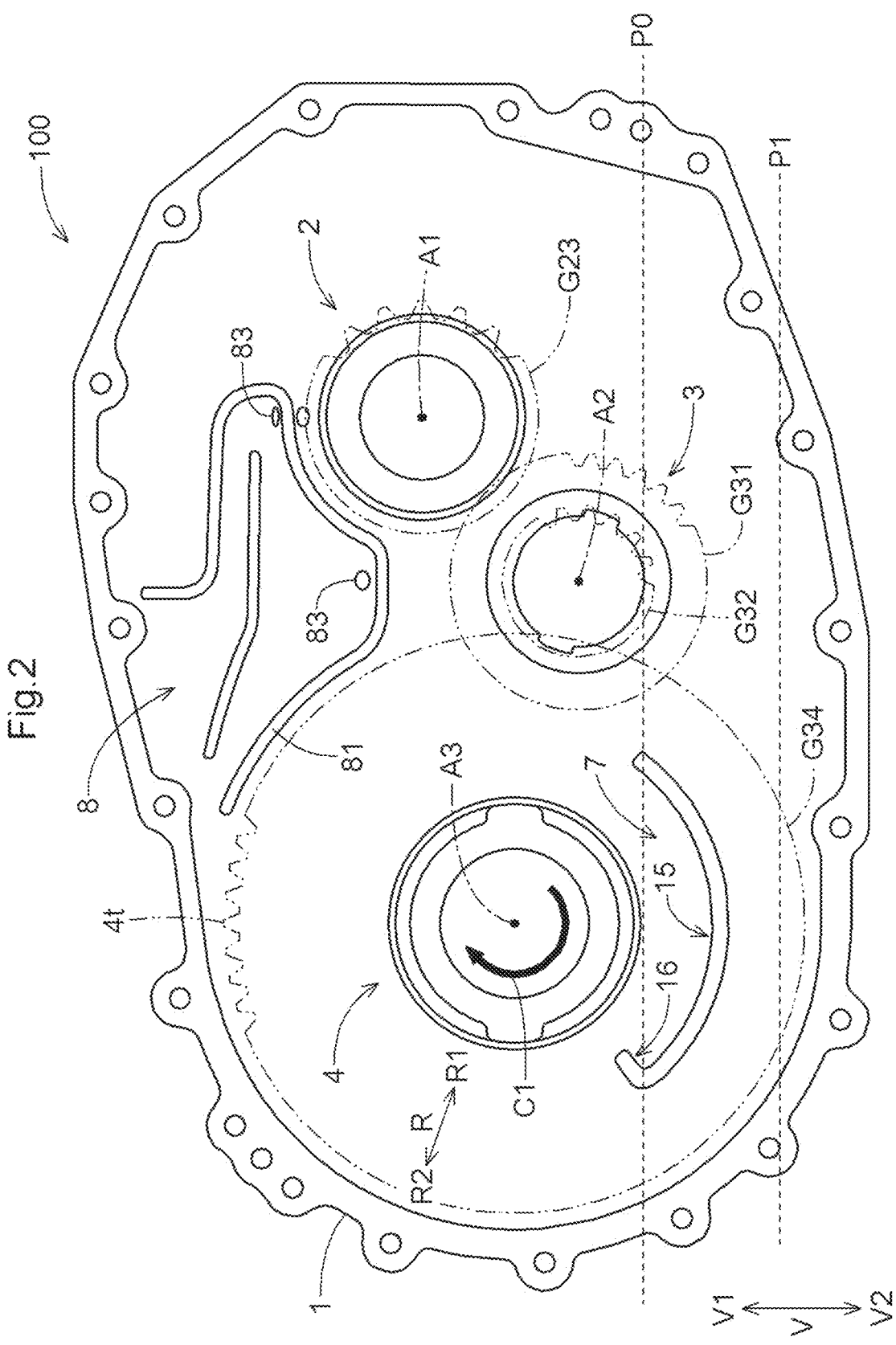
FIG. 2 is a schematic axis-orthogonal cross-sectional view of the vehicle drive transmission device.

Furthermore, in the main case 1, the surface facing the first side surrounding portion 51 in the radial direction R is defined as a specific facing surface 15, and the surface formed so as to extend to radial inside R1 from an end portion of the specific facing surface 15 on the axial first side L1 is defined as a side wall surface 17. That is, the main case 1 includes the specific facing surface 15 facing the first side surrounding portion 51 in the radial direction R, and the side wall surface 17 formed to extend to the radial inside R1 from the end portion of the specific facing surface 15 on the axial first side L1. Here, the surface of the differential input gear G34 facing the axial first side L1 is referred to as an axial first side facing surface 49 of the differential input gear G34. As illustrated in FIG. 3, in a case where the differential input gear G34 is fastened and fixed to the differential case 40 (here, support member 45) by inserting the fastening member 46 from the axial first side L1 toward the axial second side L2, the head portion of the fastening member 46 is also included in the axial first side facing surface 49. As illustrated in FIGS. 2 and 3, the specific facing surface 15 is disposed on the radial inside R1 with respect to a tooth portion 4t of the differential input gear G34. In addition, the specific facing surface 15 is formed in an arc shape as illustrated in FIG. 2 so as to surround the first side surrounding portion 51 from a lower side V2.

Here, as illustrated in FIGS. 2 and 3, the oil level in a state where the differential input gear G34 is stopped and the oil level is highest inside the main case 1 is defined as a static oil level P0. In a case where the oil level is the static oil level P0, as illustrated in FIG. 3, the opening 48 of the differential case 40 is located below the static oil level. It is only required that at least a part of the opening 48 is located on the lower side V2 with respect to the static oil level P0. Therefore, in a case where the oil level is the static oil level P0, the oil is accumulated in the space E surrounded by the specific facing surface 15, the side wall surface 17, and the axial first side facing surface 49 that is a surface of the differential input gear G34 facing the axial first side L1. That is, an oil accumulating portion 7 in which oil is accumulated is formed in the space E surrounded by the specific facing surface 15, the side wall surface 17, and the axial first side facing surface 49 of the differential input gear G34.

The oil accumulated in the oil accumulating portion 7 can enter the differential case 40 independently of the scraping by the differential input gear G34. For example, even in a case where the vehicle starts after stopping for a long period of time or even in a case where the environmental temperature is low and the viscosity of the oil is high, the oil accumulated in the oil accumulating portion 7 can be introduced into the differential case 40 along with the rotation of the differential case 40. Therefore, even at the initial stage of rotation when the differential input gear G34 starts to rotate from a stationary state, it is easy to supply lubricating oil into the differential case 40.

In addition, since the opening 48 formed in the differential case 40 is located on the lower side V2 with respect to the static oil level P0, it is easy to introduce oil into the differential case 40 from the opening 48 at the initial stage of rotation. In addition, when the differential input gear G34 rotates, the scraped oil circulates in the main case 1, so that the oil level of the oil accumulated in the main case 1 naturally decreases. Therefore, the stirring resistance of the differential input gear G34 can be reduced after the start of rotation. That is, even without the adjustment of the amount of oil by partitioning the inside of the main case 1 using another member, the lubricating oil can be appropriately supplied into the differential case 40 at the initial stage of rotation, and the stirring resistance of the differential input gear G34 can be reduced after the start of rotation. There is no need for a separate member for partitioning the inside of the main case 1 and a member for attaching the separate member, and there is no need for man-hours for attachment.

Note that, when the differential input gear G34 is rotating, the oil scraped up by the differential input gear G34 is also introduced into the differential case 40, so that the oil does not need to be accumulated in the oil accumulating portion 7. It is sufficient that the oil is accumulated in the oil accumulating portion 7 at the initial stage of rotation when the differential input gear G34 starts to rotate from a stationary state. Therefore, when the oil is accumulated in the oil accumulating portion 7 at the static oil level P0, and the differential input gear G34 and the differential case 40 start to rotate, the amount of oil gradually decreases and becomes zero with the lapse of time, which is not problematic. For example, as will be described later, by limiting the amount of oil flowing out of the oil accumulating portion 7, the oil accumulated in the oil accumulating portion 7 can be gradually reduced. As a result, it is possible to configure such that the oil is temporarily accumulated in the oil accumulating portion 7 from the state where the oil is at the static oil level P0.

As illustrated in FIG. 3, a gap D is provided between the end portion (axial second side end portion 15t) of the specific facing surface 15 on the axial second side L2 and the axial first side facing surface 49 of the differential input gear G34. Therefore, when the differential input gear G34 rotates and the oil level of the oil stored in the main case 1 decreases from the static oil level P0 and becomes lower than the specific facing surface 15, the oil accumulated in the oil accumulating portion 7 flows to the radial outside R2 through the gap D. The gap D can be set to function as a throttle in the flow path of the oil that is about to flow from the oil accumulating portion 7 to the radial outside R2. The gap D between the specific facing surface 15 and the axial first side facing surface 49 of the differential input gear G34 functions as a throttle, so that at the initial stage of rotation, the oil to be introduced into the differential case 40 can be accumulated in the oil accumulating portion 7, and after the start of rotation, the oil in the oil accumulating portion 7 can be gradually reduced.

For example, the gap D (specifically, the size of the gap D in the axial direction L) between the axial second side end portion 15t of the specific facing surface 15 and the axial first side facing surface 49 of the differential input gear G34 can be set to the size obtained by adding the maximum value of an error in a position (position in the axial direction L) where the axial second side end portion 15t is disposed in the main case 1, the maximum value of an error in an assembly position (assembly position in the axial direction L) of the differential input gear G34, and the maximum value of a fluctuation range in the axial direction L of the differential input gear G34. Here, the error in the assembly position of the differential input gear G34 is an error in the position where the differential input gear G34 is disposed in a state of being assembled to the vehicle drive transmission device 100, and includes both an error due to the assembly accuracy of the differential input gear G34 and an error in the shape (dimension) of the differential input gear G34.

When the gap D is set in this manner, it is easy to reduce the gap D while avoiding interference between the end portion (axial second side end portion 15t) of the specific facing surface 15 on the axial second side L2 and the surface (axial first side facing surface 49) of the differential input gear G34 facing the axial first side L1. The gap D can appropriately function as a throttle in the flow path of oil that is about to flow from the oil accumulating portion 7 to the radial outside R2. That is, when the gap D is set in this manner, the throttle can be appropriately provided.

In addition, as described above, the specific facing surface 15 is disposed on the radial inside R1 with respect to the tooth portion 4t of the differential input gear G34, and is formed to surround the first side surrounding portion 51 from the lower side V2. The specific facing surface 15 includes a projecting surface 16 that is bent and projects to the radial inside R1 on one side in a circumferential direction C that is a direction around the third axis A3 that is the rotation axis of the differential input gear G34. Specifically, assuming that the direction in which the differential case 40 rotates during the forward rotation of the wheel W is a circumferential forward rotation side C1, the projecting surface 16 is provided on the circumferential forward rotation side C1 of the specific facing surface 15 (see FIG. 2). That is, the main case 1 includes the projecting surface 16 formed so as to project to the radial inside R1 from the end portion of the specific facing surface 15 on the circumferential forward rotation side C1.

With this configuration, it is easy to regulate the flow of oil, which is dragged by the first side surrounding portion 51 of the differential case 40 and is about to rotate together with the differential case 40 to the circumferential forward rotation side C1, by the projecting surface 16 and to ensure the amount of oil remaining in the oil accumulating portion 7. Therefore, it is easy to introduce the oil accumulated in the oil accumulating portion 7 into the differential case 40 through the opening 48 provided in the differential case 40, and it is easy to appropriately lubricate the differential gear mechanism 44 enclosed in the differential case 40.

In the present embodiment, as illustrated in FIG. 3, the specific facing surface 15 is provided so as to overlap the tooth portion 4t of the differential input gear G34 as viewed in a radial direction along the radial direction R. Specifically, the portion of the specific facing surface 15 on the axial second side L2 overlaps the portion of the tooth portion 4t on the axial first side L1 as viewed in the radial direction. As a result, it is easy to reduce the gap D between the specific facing surface 15 and the surface of the differential input gear G34 facing the axial first side L1 (axial first side facing surface 49) while the tooth width of the differential input gear G34 is ensured. Therefore, the gap D between the end portion of the specific facing surface 15 on the axial second side L2 (axial second side end portion 15t) and the surface of the differential input gear G34 facing the axial first side L1 (axial first side facing surface 49) can easily function as a throttle in the flow path of the oil that is about to flow from the oil accumulating portion 7 to the radial outside R2. That is, with such a configuration, the throttle can be appropriately provided while the tooth width of the differential input gear G34 is ensured.

As illustrated in FIG. 2, in the present embodiment, a catch tank 8 that receives and temporarily stores the oil in the main case 1 scraped up and scattered by the differential input gear G34 is provided. For example, the catch tank 8 is formed in the space surrounded by a rib 81 projecting in the axial direction L from a wall surface of the main case 1 and the wall surface. The oil stored in the catch tank 8 is guided to an oil passage (not illustrated) formed in the main case 1 via a communication hole 83 opened in the catch tank 8, and lubricates the rotor shaft, the input shaft, the counter shaft, the input gear G23, the first counter gear G31, the second counter gear G32, and the like via the oil passage.

Since the differential input gear G34 scoops up the oil and the scooped oil circulates in the main case 1, the amount of oil accumulated at the bottom of the main case 1 decreases, so that the oil level of the oil accumulated at the bottom of the main case 1 is lower than the static oil level P0. Since the catch tank 8 is provided, the time until the oil scraped up by the differential input gear G34 returns to the lower portion of the main case 1 becomes long, and the oil level can be further lowered as compared with the case where the catch tank 8 is not provided. The oil level is lowered, and thus the stirring resistance of the differential input gear G34 can be reduced. Here, the oil level that fluctuates inside the main case 1 during rotation of the differential input gear G34 is defined as a dynamic oil level. FIGS. 2 and 3 illustrate a lowest dynamic oil level P1, which is an oil level in a case where the oil level is the lowest among the dynamic oil levels. If the lowest dynamic oil level P1 is located on the upper side V1 of the tooth portion 4t of the differential input gear G34, the oil can be scraped up by the differential input gear G34. Therefore, the amount of the oil stored in the catch tank 8 is set such that the lowest dynamic oil level P1 is not located on the lower side V2 of the tooth portion 4t of the differential input gear G34.

When the differential input gear G34 rotates, as described above, the amount of oil accumulated at the bottom of the main case 1 decreases, and the oil level also decreases. As described above, since the oil also flows out of the oil accumulating portion 7 through the gap D, the dynamic oil level in the oil accumulating portion 7 also decreases. In the present embodiment, it is configured that the lowering speed of the dynamic oil level in the oil accumulating portion 7 is slower than the lowering speed of the dynamic oil level around the differential input gear G34 during the rotation of the differential input gear G34.

Since a part of the oil scraped up by the differential input gear G34 is stored in the catch tank 8, the dynamic oil level, which is the oil level of the oil stored at the bottom of the main case 1 during the rotation of the differential input gear G34, is lower than the static oil level P0. The stirring resistance of the differential input gear G34 decreases as the dynamic oil level is lowered. According to this configuration, the dynamic oil level around the differential input gear G34 becomes lower more quickly than the dynamic oil level in the oil accumulating portion 7. That is, The oil accumulated in the oil accumulating portion 7 gradually decreases as compared with the oil around the differential input gear G34. Therefore, at the initial stage of rotation, sufficient oil can be ensured in the oil accumulating portion 7, and the oil can be appropriately introduced into the differential case 40.

The oil accumulated in the oil accumulating portion 7 flows from the oil accumulating portion 7 to the radial outside R2 through the gap D between the end portion (axial second side end portion 15*t*) of the specific facing surface 15 on the axial second side L2 and the surface (axial first side facing surface 49) of the differential input gear G34 facing the axial first side L1. On the other hand, during the rotation of the differential input gear G34, the oil scraped up by the differential input gear G34 falls and also flows into the oil accumulating portion 7. When the amount of oil flowing out of the oil accumulating portion 7 is larger than the amount of oil flowing into the oil accumulating portion 7 during the rotation of the differential input gear G34, the oil accumulated in the oil accumulating portion 7 gradually approaches zero. Therefore, when the rotation of the differential input gear G34 is in a steady state, the differential gear mechanism 44 enclosed in the differential case 40 can be appropriately lubricated by the oil scraped up by the differential input gear G34, and the rotational resistance of the differential case 40 due to the oil in the oil accumulating portion 7 can be reduced.

As described above, according to the present embodiment, it is possible to achieve the vehicle drive transmission device 100 capable of appropriately supplying lubricating oil into the differential case 40 enclosing the differential gear mechanism 44 even at the initial stage of rotation when the differential input gear G34 that transmits drive power to the differential gear mechanism 44 starts to rotate from a stationary state, without providing a member such as a baffle plate.

OTHER EMBODIMENTS

Other embodiments will be described below. Note that the configurations of the individual embodiments described below are not limited to those applied alone, and can be applied in combination with the configurations of other embodiments as long as there is no contradiction.

(1) In the above description, the vehicle drive transmission device 100 with a three-axis configuration in which three axes, that is, the first axis A1, the second axis A2, and the third axis A3 are arranged in parallel has been described as an example, but the vehicle drive transmission device 100 may have a two-axis configuration in which two axes, for example, the first axis A1 and the second axis A2 are arranged in parallel. In addition, the vehicle drive transmission device 100 may have a configuration in which one or more axes different from the first axis A1, the second axis A2, and the third axis A3 are further arranged in parallel, and four or more axes are arranged in parallel. Furthermore, the vehicle drive transmission device 100 may have a single-axis configuration in which the rotating electrical machine 2, the gear mechanism 6, and the differential gear mechanism 44 are arranged on the same axis.

(2) In the above description, the vehicle drive transmission device 100 including the rotating electrical machine 2 as the drive power source of the wheels W has been described as an example, but the drive power source may be an internal combustion engine. Furthermore, the vehicle drive transmission device 100 may be a hybrid drive device (for example, various types of hybrid drive devices such as a one-motor parallel type and a two-motor split type) including both an internal combustion engine and the rotating electrical machine 2 as the drive power source for the wheels W of the vehicle.

(3) In the above description, with reference to FIG. 3, a mode has been exemplified in which the differential input gear G34 is disposed closest to the axial second side L2 of the differential gear device 4, and all the gear units constituting the differential gear mechanism 44 correspond to the first side projection 5 disposed to project to the axial first side L1 with respect to the differential input gear G34. However, the differential gear device 4 may have a configuration in which some of the gear units constituting the differential gear mechanism 44 are also arranged on the axial second side L2 with respect to the differential input gear G34.

(4) In the above description, a mode has been exemplified in which the main case 1 includes the projecting surface 16 formed so as to project to the radial inside R1 from the end portion of the specific facing surface 15 on the circumferential forward rotation side C1. However, the main case 1 may include a second projecting surface formed so as to project to the radial inside R1 from the end portion of the specific facing surface 15 on the side on which the differential case 40 rotates during the reverse rotation of the wheel W, that is, on the circumferential reverse rotation side opposite to the circumferential forward rotation side C1. In this case, oil can be appropriately introduced into the differential case 40 even at the initial stage of rotation of the differential input gear G34 in a case where the vehicle in a stopped state starts to travel in the direction in which the wheels W rotate reverse.

(5) In the above description, the mode in which the main case 1 includes the projecting surface 16 and the mode in which the main case includes the projecting surface 16 and the second projecting surface have been exemplified, but the main case does not need to include the projecting surface 16 and the second projecting surface. If the projecting surface 16 and the second projecting surface are provided, the flow of oil that is dragged by the first side surrounding portion 51 of the differential case 40 and is about to rotate together with the differential case 40 is regulated, and the amount of oil remaining in the oil accumulating portion 7 can be easily ensured. However, since the opening 48 of the differential case 40 is located on the lower side V2 of the static oil level P0, it is ensured that oil is introduced from the opening 48 when the differential case 40 starts to rotate. Therefore, the mode in which the projecting surface 16 and the second projecting surface are not provided is not hindered.

(6) In the above description, a mode has been exemplified in which the gap D between the axial second side end portion 15*t* of the specific facing surface 15 and the axial first side facing surface 49 of the differential input gear G34 is set to function as a throttle. However, the gap D does not necessarily function as a throttle. At least at the first round of rotation, even a small amount of oil accumulated in the oil accumulating portion 7 is introduced into the differential case 40. Oil is also introduced into the differential case 40 from the opening 48 until at least the static oil level P0 becomes lower than the opening 48 of the differential case 40. Therefore, the configuration in which oil flows out of the oil accumulating portion 7 faster than the reduction speed in the case of providing the throttle is not hindered.

(7) In the above description, for example, a mode has been exemplified in which the gap D between the axial second side end portion 15*t* of the specific facing surface 15 and the axial first side facing surface 49 of the differential input gear G34 is set to the size obtained by adding the maximum value of the error in the position where the axial second side end portion 15*t* is disposed in the main case 1, the maximum value of the error in the assembly position of the differential input gear G34, and the maximum value of the fluctuation range in the axial direction L of the differential input gear G34. By setting the gap D in this manner, the throttle can be appropriately provided, but this does not hinder an increase in the outflow amount of oil from the oil accumulating portion 7, and the gap D may be larger than this.

(8) In the above description, the mode in which the specific facing surface 15 is provided so as to overlap the tooth portion 4*t* of the differential input gear G34 as viewed in the radial direction has been exemplified. As a result, it is easy to reduce the gap D between the specific facing surface 15 and the surface of the differential input gear G34 facing the axial first side L1 (axial first side facing surface 49) while the tooth width of the differential input gear G34 is ensured, and it is easy to appropriately set the function as a throttle. However, this does not hinder an increase in the outflow amount of oil from the oil accumulating portion 7, and does not hinder a mode in which the specific facing surface 15 does not overlap the tooth portion 4*t* of the differential input gear G34 as viewed in the radial direction.

(9) In the above description, the mode including the catch tank 8 that temporarily stores a part of the oil scraped up by the differential input gear G34 has been exemplified, but it does not hinder a mode not including the catch tank 8. Since the oil scraped up by the differential input gear G34 scatters in the main case 1 and then flows downward, the oil level is lower than the static oil level P0 during the rotation of the differential input gear G34. Therefore, the stirring resistance of the differential input gear G34 decreases as the oil level decreases. As long as the structure capable of appropriately supplying oil to a portion to be lubricated is provided, the catch tank 8 does not need to be provided.

(10) In the above description, a mode has been exemplified in which the amount of oil flowing out of the oil accumulating portion 7 during the rotation of the differential input gear G34 is larger than the amount of oil flowing into the oil accumulating portion 7. However, it does not hinder a mode in which the amount of oil flowing out of the oil accumulating portion 7 is equal to the amount of oil flowing into the oil accumulating portion 7, or a mode in which the amount of oil flowing into the oil accumulating portion 7 is larger than the amount of oil flowing out of the oil accumulating portion 7.

SUMMARY OF PRESENT EMBODIMENT

Hereinafter, the vehicle drive transmission device (100) described above will be briefly summarized.

As one aspect, a vehicle drive transmission device (100) is a vehicle drive transmission device (100) including a differential gear device (4) and a main case (1) that houses the differential gear device (4) and stores oil therein, the differential gear device (4) includes a differential input gear (G34) to which drive power from a drive source (2) of a wheel (W) is transmitted, a differential gear mechanism (44) that distributes drive power transmitted to the differential input gear (G34) to a pair of output members (9, 43) each of which is drivingly coupled to a pair of the wheels (W), and a differential case (40) that is coupled to the differential input gear (G34) so as to rotate integrally with the differential input gear and encloses the differential gear mechanism (44), the differential case (40) includes an opening (48) that communicates inside in which the differential gear mechanism (44) is disposed and outside, when a direction along a rotation axis (A3) of the differential input gear (G34) is defined as an axial direction (L), a direction orthogonal to the rotation axis (A3) is defined as a radial direction (R), and one side in the axial direction (L) is defined as an axial first side (L1), the differential gear mechanism (44) includes a first side projection (5) that is a portion disposed so as to project to the axial first side (L1) with respect to the differential input gear (G34), when a portion surrounding the first side projection (5) in the differential case (40) is defined as a first side surrounding portion (51), the main case (1) includes a specific facing surface (15) facing the first side surrounding portion (51) in the radial direction (R), and a side wall surface (17) formed so as to extend inside (R1) in the radial direction (R) from an end portion of the specific facing surface (15) on the axial first side (L1), the specific facing surface (15) is disposed inside (R1) in the radial direction (R) with respect to a tooth portion (4*t*) of the differential input gear (G34), and is formed so as to surround the first side surrounding portion (51) from a lower side (V2), and when an oil level in a state where the differential input gear (G34) stops, and the oil level is the highest inside the main case (1) is defined as a static oil level (P0), the opening (48) is located on a lower side (V2) with respect to the static oil level (P0), and an oil accumulating portion (7) in which oil is accumulated is formed in a space surrounded by the specific facing surface (15), the side wall surface (17), and a surface (49) of the differential input gear (G34) facing the axial first side (L1).

The oil accumulated in the oil accumulating portion (7) is less likely to be affected by the scraping by the differential input gear (G34). According to this configuration, for example, even in a case where the vehicle starts after stopping for a long period of time, the oil accumulated in the oil accumulating portion (7) can be introduced into the differential case (40) along with the rotation of the differential case (40). Therefore, at the initial stage of rotation when the differential input gear (G34) starts to rotate from a stationary state, it is easy to supply the lubricating oil into the differential case (40). In addition, since the opening (48) formed in the differential case (40) is located on the lower side (V2) with respect to the static oil level (P0), it is also easy to introduce oil into the differential case (40) from the opening (48) at the initial stage of rotation. When the differential input gear (G34) rotates, the oil circulates in the main case 1 by scraping up, so that the oil level of the oil accumulated in the main case (1) naturally decreases. That is, according to this configuration, by providing the oil accumulating portion (7), it is possible to appropriately supply the lubricating oil into the differential case (40) even at the initial stage of rotation without adjusting the height of the oil level using the baffle plate, and it is possible to reduce the stirring resistance of the differential input gear (G34) after the start of rotation. As described above, according to this configuration, it is possible to achieve the vehicle drive transmission device (100) capable of appropriately supplying the lubricating oil into the differential case (40) enclosing the differential gear mechanism (44) even at the initial stage of rotation when the differential input gear (G34) that transmits the drive power to the differential gear mechanism (44) starts to rotate from a stationary state, without providing the baffle plate.

Here, when the other side in the axial direction (L) is defined as an axial second side (L2), a gap (D) between an end portion (15t) of the specific facing surface (15) on the axial second side (L2) and a surface (49) of the differential input gear (G34) facing the axial first side (L1) is preferably set to function as a throttle in a flow path of oil that is about to flow outside (R2) in the radial direction (7) from the oil accumulating portion (7).

Since the gap (D) is provided between the end portion (15t) of the specific facing surface (15) on the axial second side (L2) and the surface (49) of the differential input gear (G34) facing the axial first side (L1), when the differential input gear (G34) rotates and the oil level of the oil stored in the main case (1) decreases from the static oil level (P0) and becomes lower than the specific facing surface (15), the oil accumulated in the oil accumulating portion (7) flows from the gap (D) to the radial outside (R2). According to this configuration, the gap (D) is set to function as a throttle in the flow path of the oil that is about to flow from the oil accumulating portion (7) to the radial outside (R2). The gap (D) between the specific facing surface (15) and the surface (49) of the differential input gear (G34) facing the axial first side (L1) functions as a throttle, so that at the initial stage of rotation, the oil to be introduced into the differential case (40) can be accumulated in the oil accumulating portion (7), and after the start of rotation, the oil in the oil accumulating portion (7) can be gradually reduced.

Furthermore, when a direction around the rotation axis (A3) is defined as a circumferential direction (C), and a side on which the differential case (40) rotates during forward rotation of the wheel (W) is defined as a circumferential forward rotation side (C1), the main case (1) preferably further includes a projecting surface (16) formed to project inside (R1) in the radial direction (R) from an end portion of the specific facing surface (15) on the circumferential forward rotation side (C1).

With this configuration, it is easy to regulate the flow of oil, which is dragged by the first side surrounding portion (51) of the differential case (40) and is about to rotate together with the differential case (40) to the circumferential forward rotation side (C1), by the projecting surface (16) and to ensure the amount of oil remaining in the oil accumulating portion (7). Therefore, it is easy to introduce the oil accumulated in the oil accumulating portion (7) into the differential case (40) through the opening (48) provided in the differential case (40), and it is easy to appropriately lubricate the differential gear mechanism (44) enclosed in the differential case (40).

Furthermore, the specific facing surface (15) is preferably provided so as to overlap a tooth portion (4t) of the differential input gear (G34) as viewed in a radial direction along the radial direction (R).

According to this configuration, it is easy to reduce the gap (D) between the specific facing surface (15) and the surface (49) of the differential input gear (G34) facing the axial first side (L1) while the tooth width of the differential input gear (G34) is ensured. Therefore, the gap (D) between the end portion (15t) of the specific facing surface (15) on the axial second side (L2) and the surface (49) of the differential input gear (G34) facing the axial first side (L1) can easily function as a throttle in the flow path of the oil that is about to flow from the oil accumulating portion (7) to the radial outside (R2). That is, according to this configuration, the throttle can be appropriately provided while the tooth width of the differential input gear (G34) is ensured.

Furthermore, when the other side in the axial direction (L) is defined as an axial second side (L2), a gap (D) between an end portion (15t) of the specific facing surface (15) on the axial second side (L2) and a surface (49) of the differential input gear (G34) facing the axial first side (L1) is preferably set to a size obtained by adding a maximum value of an error in a position where the end portion (15t) of the specific facing surface (15) on the axial second side (L2) is disposed in the main case (1), a maximum value of an error in an assembly position of the differential input gear (G34), and a maximum value of a fluctuation range in the axial direction (L) of the differential input gear (G34).

When the gap (D) is set in this manner, it is easy to reduce the gap (D) while avoiding interference between the end portion (15t) of the specific facing surface (15) on the axial second side (L2) and the surface (49) of the differential input gear (G34) facing the axial first side (L1). The gap (D) can appropriately function as a throttle in the flow path of oil that is about to flow from the oil accumulating portion (7) to the radial outside (R2). That is, when the gap (D) is set in this manner, the throttle can be appropriately provided.

The vehicle drive transmission device (100) further includes a catch tank (8) that temporarily stores oil in the main case (1), when an oil level that fluctuates inside the main case (1) during rotation of the differential input gear (G34) is defined as a dynamic oil level, a lowering speed of the dynamic oil level in the oil accumulating portion (7) is preferably slower than a lowering speed of the dynamic oil level around the differential input gear (G34).

Since a part of the oil scraped up by the differential input gear (G34) is stored in the catch tank (8), the dynamic oil level, which is the oil level of the oil stored at the bottom of the main case (1) during the rotation of the differential input gear (G34), is lower than the static oil level (P0). The stirring resistance of the differential input gear (G34) decreases as the dynamic oil level is lowered. According to this configuration, the dynamic oil level around the differential input gear (G34) becomes lower more quickly than the dynamic oil level in the oil accumulating portion (7). That is, the oil accumulated in the oil accumulating portion (7) gradually decreases as compared with the oil around the differential input gear (G34). Therefore, at the initial stage of rotation, sufficient oil can be ensured in the oil accumulating portion (7), and the oil can be appropriately introduced into the differential case (40).

Furthermore, in the vehicle drive transmission device (100), an amount of oil flowing out of the oil accumulating portion (7) during rotation of the differential input gear (G34) is preferably larger than an amount of oil flowing into the oil accumulating portion (7).

The oil accumulated in the oil accumulating portion (7) flows from the oil accumulating portion (7) to the radial outside (R2) through the gap (D) between the end portion (15t) of the specific facing surface (15) on the axial second side (L2) and the surface (49) of the differential input gear (G34) facing the axial first side (L1). On the other hand, during the rotation of the differential input gear (G34), the oil scraped up by the differential input gear (G34) falls and also flows into the oil accumulating portion (7). When the amount of oil flowing out of the oil accumulating portion (7) is larger than the amount of oil flowing into the oil accumulating portion (7) during the rotation of the differential input gear (G34), the oil accumulated in the oil accumulating portion (7) gradually approaches zero. Therefore, when the rotation of the differential input gear (G34) is in a steady state, the differential gear mechanism (44) enclosed in the differential case (40) can be appropriately lubricated by the oil scraped up by the differential input gear (G34), and the rotational resistance of the differential case (40) due to the oil in the oil accumulating portion (7) can be reduced.

REFERENCE SIGNS LIST

1: Main case, 2: Rotating electrical machine (drive source of wheel), 4: Differential gear device, 4t: Tooth portion, 5: First side projection, 7: Oil accumulating portion, 8: Catch tank, 9: Drive shaft (output member), 15: specific facing surface, 15t: axial second side end portion (end portion of the specific facing surface on the axial second side), 16: Projecting surface, 17: Side wall surface, 40: Differential case, 43: Side gear (output member), 44: Differential gear mechanism, 48: Opening (opening formed in the differential case in a manner that oil can flow), 49: Axial first side facing surface (surface of the differential input gear facing the axial first side), 51: First side surrounding portion, 100: Vehicle drive transmission device, A3: Third axis (rotation axis of the differential input gear), C: Circumferential direction, C1: Circumferential forward rotation side, D: Gap (gap between the end portion of the specific facing surface on the axial second side and the surface of the differential input gear facing the axial first side), E: Space (space surrounded by the specific facing surface, the side wall surface, and the surface of the differential input gear facing the axial first side), G34: Differential input gear, L: Axial direction, L1: Axial first side, L2: Axial second side, P0: Static oil level, R: Radial direction, R1: Radial inside (inside in the radial direction), R2: Radial outside (outside in the radial direction), V2: Lower side, and W: Wheel.

The invention claimed is:

1. A vehicle drive transmission device comprising a differential gear device and a main case that houses the differential gear device and stores oil therein, wherein the differential gear device includes a differential input gear to which drive power from a drive source of a wheel is transmitted, a differential gear mechanism that distributes drive power transmitted to the differential input gear to a pair of output members each of which is drivingly coupled to a pair of the wheels, and a differential case that is coupled to the differential input gear so as to rotate integrally with the differential input gear and encloses the differential gear mechanism, the differential case includes an opening that communicates inside in which the differential gear mechanism is disposed and outside, when a direction along a rotation axis of the differential input gear is defined as an axial direction, a direction orthogonal to the rotation axis is defined as a radial direction, and one side in the axial direction is defined as an axial first side, the differential gear mechanism includes a first side projection that is a portion disposed so as to project to the axial first side with respect to the differential input gear, when a portion surrounding the first side projection in the differential case is defined as a first side surrounding portion, the main case includes a specific facing surface facing the first side surrounding portion in the radial direction, and a side wall surface formed so as to extend inside in the radial direction from an end portion of the specific facing surface on the axial first side, the specific facing surface is disposed inside in the radial direction with respect to a tooth portion of the differential input gear, and is formed so as to surround the first side surrounding portion from a lower side, and when an oil level in a state where the differential input gear stops, and the oil level is the highest inside the main case is defined as a static oil level, the opening is located on a lower side with respect to the static oil level, and an oil accumulating portion in which oil is accumulated is formed in a space surrounded by the specific facing surface, the side wall surface, and a surface of the differential input gear facing the axial first side, wherein when the other side in the axial direction is defined as an axial second side, a gap between an end portion of the specific facing surface on the axial second side and a surface of the differential input gear facing the axial first side is set to function as a throttle in a flow path of oil that is about to flow outside in the radial direction from the oil accumulating portion.

2. The vehicle drive transmission device according to claim 1, wherein when a direction around the rotation axis is defined as a circumferential direction, and a side on which the differential case rotates during forward rotation of the wheel is defined as a circumferential forward rotation side, the main case further includes a projecting surface formed to project inside in the radial direction from an end portion of the specific facing surface on the circumferential forward rotation side.

3. The vehicle drive transmission device according to claim 1, wherein the specific facing surface is provided so as to overlap a tooth portion of the differential input gear as viewed in a radial direction along the radial direction.

4. The vehicle drive transmission device according to claim 1, wherein when the other side in the axial direction is defined as the axial second side, the gap between the end portion of the specific facing surface on the axial second side and the surface of the differential input gear facing the axial first side is set to a size obtained by adding a maximum value of an error in a position where the end portion of the specific facing surface on the axial second side is disposed in the main case, a maximum value of an error in an assembly position of the differential input gear, and a maximum value of a fluctuation range in the axial direction of the differential input gear.

5. The vehicle drive transmission device according to claim 1, further comprising a catch tank that temporarily stores oil in the main case, wherein when an oil level that fluctuates inside the main case during rotation of the differential input gear is defined as a dynamic oil level, a lowering speed of the dynamic oil level in the oil accumulating portion is slower than a lowering speed of the dynamic oil level around the differential input gear.

6. The vehicle drive transmission device according to claim 1, wherein an amount of oil flowing out of the oil accumulating portion during rotation of the differential input gear is larger than an amount of oil flowing into the oil accumulating portion.

7. A vehicle drive transmission device comprising a differential gear device and a main case that houses the differential gear device and stores oil therein, wherein the differential gear device includes a differential input gear to which drive power from a drive source of a wheel is transmitted, a differential gear mechanism that distributes drive power transmitted to the differential input gear to a pair of output members each of which is drivingly coupled to a pair of the wheels, and a differential case that is coupled to the differential input gear so as to rotate integrally with the differential input gear and encloses the differential gear mechanism, the differential case includes an opening that communicates inside in which the differential gear mechanism is disposed and outside, when a direction along a rotation axis of the differential input gear is defined as an axial direction, a direction orthogonal to the rotation axis is defined as a radial direction, and one side in the axial direction is defined as an axial first side, the differential gear mechanism includes a first side projection that is a portion disposed so as to project to the axial first side with respect to the differential input gear, when a portion surrounding the first side projection in the differential case is defined as a first side surrounding portion, the main case includes a specific facing surface facing the first side surrounding portion in the radial direction, and a side wall surface formed so as to extend inside in the radial direction from an end portion of the specific facing surface on the axial first side, the specific facing surface is disposed inside in the radial direction with respect to a tooth portion of the differential input gear, and is formed so as to surround the first side surrounding portion from a lower side, and when an oil level in a state where the differential input gear stops, and the oil level is the highest inside the main case is defined as a static oil level, the opening is located on a lower side with respect to the static oil level, and an oil accumulating portion in which oil is accumulated is formed in a space surrounded by the specific facing surface, the side wall surface, and a surface of the differential input gear facing the axial first side, wherein the specific facing surface is provided so as to overlap a tooth portion of the differential input gear as viewed in a radial direction along the radial direction.

8. A vehicle drive transmission device comprising a differential gear device and a main case that houses the differential gear device and stores oil therein, wherein the differential gear device includes a differential input gear to which drive power from a drive source of a wheel is transmitted, a differential gear mechanism that distributes drive power transmitted to the differential input gear to a pair of output members each of which is drivingly coupled to a pair of the wheels, and a differential case that is coupled to the differential input gear so as to rotate integrally with the differential input gear and encloses the differential gear mechanism, the differential case includes an opening that communicates inside in which the differential gear mechanism is disposed and outside, when a direction along a rotation axis of the differential input gear is defined as an axial direction, a direction orthogonal to the rotation axis is defined as a radial direction, and one side in the axial direction is defined as an axial first side, the differential gear mechanism includes a first side projection that is a portion disposed so as to project to the axial first side with respect to the differential input gear, when a portion surrounding the first side projection in the differential case is defined as a first side surrounding portion, the main case includes a specific facing surface facing the first side surrounding portion in the radial direction, and a side wall surface formed so as to extend inside in the radial direction from an end portion of the specific facing surface on the axial first side, the specific facing surface is disposed inside in the radial direction with respect to a tooth portion of the differential input gear, and is formed so as to surround the first side surrounding portion from a lower side, and when an oil level in a state where the differential input gear stops, and the oil level is the highest inside the main case is defined as a static oil level, the opening is located on a lower side with respect to the static oil level, and an oil accumulating portion in which oil is accumulated is formed in a space surrounded by the specific facing surface, the side wall surface, and a surface of the differential input gear facing the axial first side, wherein when the other side in the axial direction is defined as an axial second side, a gap between an end portion of the specific facing surface on the axial second side and a surface of the differential input gear facing the axial first side is set to a size obtained by adding a maximum value of an error in a position where the end portion of the specific facing surface on the axial second side is disposed in the main case, a maximum value of an error in an assembly position of the differential input gear, and a maximum value of a fluctuation range in the axial direction of the differential input gear.

\* \* \* \* \*